(12) United States Patent
Hancock et al.

(10) Patent No.: US 9,659,410 B2
(45) Date of Patent: May 23, 2017

(54) LOW LATENCY AUGMENTED REALITY DISPLAY

(71) Applicant: HONEYWELL INTERNATIONAL INC., Morristown, NJ (US)

(72) Inventors: William Ray Hancock, Phoenix, AZ (US); James C. Fye, Scottsdale, AZ (US); Ken Leiphon, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 100 days.

(21) Appl. No.: 14/519,457

(22) Filed: Oct. 21, 2014

(65) Prior Publication Data
US 2016/0110919 A1    Apr. 21, 2016

(51) Int. Cl.
*G06T 19/00* (2011.01)
*G06T 19/20* (2011.01)
(Continued)

(52) U.S. Cl.
CPC .......... *G06T 19/006* (2013.01); *G02B 27/017* (2013.01); *G06T 1/60* (2013.01); *G06T 3/4092* (2013.01); *G06T 15/005* (2013.01); *G06T 19/20* (2013.01); *G06T 2200/16* (2013.01); *G06T 2207/10024* (2013.01); *G06T 2210/36* (2013.01)

(58) Field of Classification Search
CPC .................................................... G06T 19/006
See application file for complete search history.

(56) References Cited

U.S. PATENT DOCUMENTS 5,912,972 A    6/1999  Barton
6,061,064 A  * 5/2000  Reichlen ................. G06F 3/011
                                                    345/418
(Continued)

FOREIGN PATENT DOCUMENTS

EP    1155386 A1    11/2001
EP    2541942 A1    1/2013
(Continued)

OTHER PUBLICATIONS

Lee, B.W. et al.; Mastering the Moving Image: Refreshing TFT-LCDs at 120 Hz; SID Symposium Digest of Technical Papers; vol. 36, Issue 1, (/doi/10.1111/sdtp.2005.36.issue-1/issuetoc) pp. 1583-1585, May 2005.
(Continued)

*Primary Examiner* — Daniel Hajnik
(74) *Attorney, Agent, or Firm* — Lorenz & Kopf, LLP (57) ABSTRACT

An augmented reality system is provided and a method for controlling an augmented reality system are provided. The augmented reality system, for example, may include, but is not limited to a display, a memory, and at least one processor communicatively coupled to the display and memory, the at least one processor configured to generate image data having a first resolution at a first rate, store the generated image data in the memory, and transfer a portion of the generated image data having a second resolution to the display from the memory at a second rate, wherein the second rate is faster than the first rate and the second resolution is smaller than the first resolution. This dual rate system then enables a head-tracked augmented reality system to be updated at the high rate, reducing latency based artifacts.

15 Claims, 3 Drawing Sheets

(51) Int. Cl.
  *G06T 3/40* (2006.01)
  *G06T 1/60* (2006.01)
  *G06T 15/00* (2011.01)
  *G02B 27/01* (2006.01)

(56) References Cited

U.S. PATENT DOCUMENTS

| | | | |
|---|---|---|---|
| 6,525,723 B1 | 2/2003 | Deering | |
| 8,184,069 B1* | 5/2012 | Rhodes | G02B 27/017 345/8 |
| 8,322,863 B1 | 12/2012 | Cho et al. | |
| 2005/0285878 A1* | 12/2005 | Singh | H04M 1/72544 345/633 |
| 2006/0197768 A1* | 9/2006 | Van Hook | G06T 15/005 345/546 |
| 2009/0160857 A1* | 6/2009 | Rasmusson | G06T 15/04 345/422 |
| 2010/0231693 A1* | 9/2010 | Levola | G02B 27/0081 348/51 |
| 2013/0014198 A1 | 1/2013 | Rapinat et al. | |
| 2013/0113827 A1 | 5/2013 | Forutanpour et al. | |
| 2013/0187952 A1 | 7/2013 | Berkovich et al. | |
| 2014/0087867 A1* | 3/2014 | Hightower | G02B 27/017 463/31 |
| 2014/0184615 A1* | 7/2014 | Bergquist | G09G 5/02 345/503 |
| 2015/0189190 A1* | 7/2015 | Fung | H04N 5/262 348/222.1 |
| 2015/0316766 A1* | 11/2015 | Weaver | G02B 27/0172 345/591 |

FOREIGN PATENT DOCUMENTS

| | | |
|---|---|---|
| WO | 2011112861 A1 | 9/2011 |
| WO | 20140069090 A1 | 5/2014 |

OTHER PUBLICATIONS

EP Partial Search Report for Application No. 15190140.2-1502 dated Mar. 24, 2016.
Extended EP Search Report for Application No. 151901402-1502/ 3021285 dated Jul. 27, 2016.

* cited by examiner

LOW LATENCY AUGMENTED REALITY DISPLAY

TECHNICAL FIELD

The present disclosure generally relates to displays, and more particularly relates to augmented reality display systems.

BACKGROUND

Augmented reality is a live direct or indirect view of a physical, real-world environment whose elements are augmented (or supplemented) by computer-generated sensory input such as sound, video, graphics, global positioning system (GPS) data or the like. Augmented reality display systems can be integrated into head-up displays, head-mounted displays, cellular phones, computers, tablets, or the like. Typical augmented reality display systems suffer from high latency, rainbow effects and non-conformal imagery. As a user moves, either a display itself or the user's head/eyes, the image on the display must be updated. Some displays, for example, excite red, green and blue pixels at different times to form an image. When a user or display is moved faster than a single excitation cycle through the colors, rainbow effects can appear as the different colors get overlaid over different areas rather than on top of one another. Furthermore, the images in conventional augmented reality displays tend to be non-conformal. In other words, in typical augmented reality displays the displayed image tends to jitter, have delayed movement or otherwise appear where it shouldn't appear. These effects can cause nausea in some users.

BRIEF SUMMARY

In one embodiment, for example, an augmented reality system is provided. The augmented reality system may include, but is not limited to, a display, a memory, and at least one processor communicatively coupled to the display and memory, the at least one processor configured to generate image data having a first resolution at a first rate, store the generated image data in the memory, and transfer a portion of the generated image data having a second resolution to the display from the memory at a second rate, wherein the second rate is faster than the first rate and the second resolution is smaller than the first resolution.

In another embodiment, a method of controlling an augmented reality system is provided. The method may include, but is not limited to generating, by at least one processor, image data having a first resolution at a first rate, storing, by the at least one processor, the generated image data in a memory, transferring, by the at least one processor, a portion of the generated image data having a second resolution to a display of the augmented reality system from the memory at a second rate, wherein the second rate is faster than the first rate and the second resolution is smaller than the first resolution In yet another embodiment, a non-transitory computer readable medium is provided. The non-transitory computer readable medium stores instructions, which when executed by a processor, cause the processor to generate image data having a first resolution at a first rate, store the generated image data in a memory, transfer a portion of the generated image data having a second resolution to a display from the memory at a second rate, wherein the second rate is faster than the first rate and the second resolution is smaller than the first resolution.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with one embodiment, an augmented reality system is provided. The augmented reality system generates image data at a first slower rate, but updates a display of the augmented reality system at a second higher rate. In order to have enough data to update the display at the second higher rate, the size of the image generated is larger than the display of the augmented reality system is capable of displaying. As discussed in further detail below, the generated image is saved in a super buffer and updated at the first rate. A portion of the generated image is then selectively displayed on the display based upon a position of a head, of the user, an eye of the user or a position of the display itself. This configuration allows the conformal display aspects and the retinal positioning aspects of the augmented reality system to be updated at very high rates, for example, around four hundred and eighty hertz, while only requiring image data to be generated at a lower rate, for example around sixty hertz. One advantage of the augmented reality system described herein is that image displayed on the display can be updated at a very fast rate to maintain conformal registration and readability of displayed objects during head motion, reducing latency and other visual effects, without requiring image data to be generated at the higher rate, dramatically reducing the processing power required to update the display to properly register the image on the eye at the higher rate.

Figure 1:
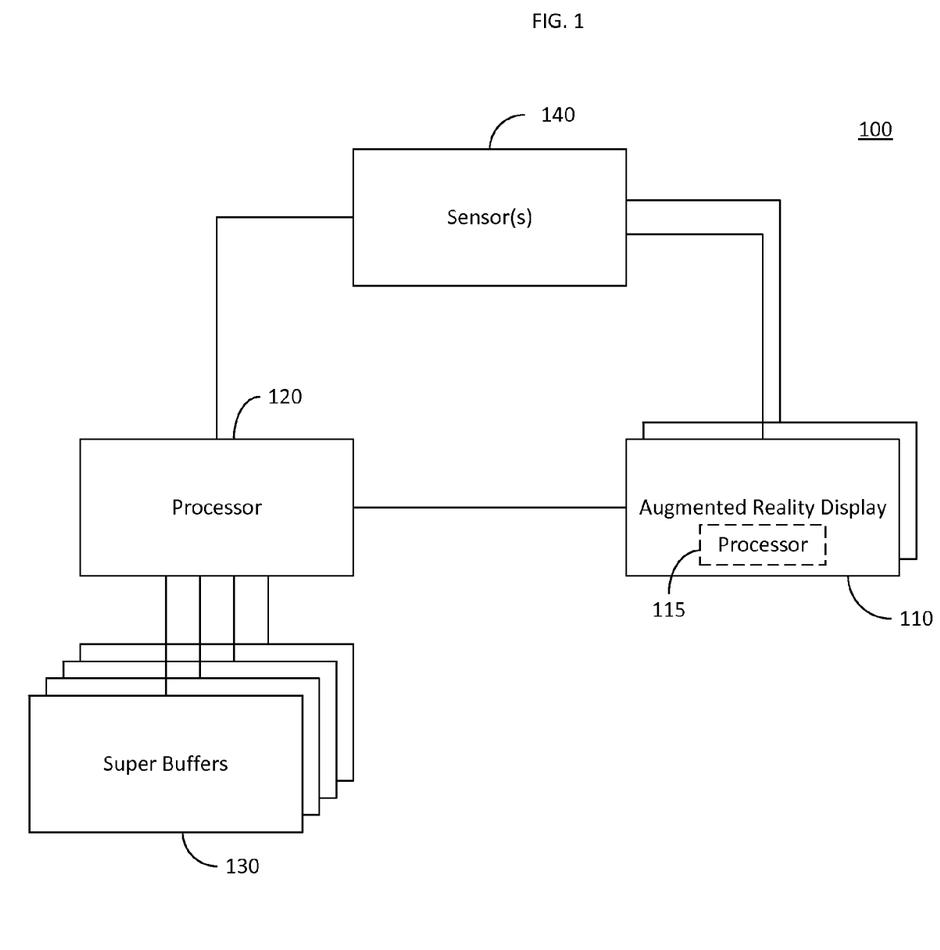
FIG. 1 is a block diagram of an exemplary augmented reality system, in accordance with an embodiment.

FIG. 1 is a block diagram of an augmented reality system 100, in accordance with an embodiment. The augmented reality system 100 includes one or more displays 110. In one embodiment, for example, each display 110 may be dedicated to one eye of a user. In this embodiment, for example, each display 110 may be mounted in, or proximate to, a lens in glasses, goggles, or the like, or may be arranged as any other type of near-to-eye display. In other embodiments, for example, a display 110 may be visible to more than one eye or more than one user. In this embodiment, the display 110 may be part of a dedicated augmented reality system, or may be integrated into another device, such as a cell phone, tablet or the like. In one embodiment, for example, when the augmented reality system 100 is in the cockpit of an aircraft, one or more displays 110 may be used by a pilot and one or more other displays 110 may be used by a co-pilot or other crew member.

Each display 110 may be, for example, a liquid crystal display (LCD), an organic light emitting diode display (OLED), a liquid crystal on silicon display (LCOS), a head-up display (HUD), a projected display, a waveguide display, or the like. Each display 110 in the augmented reality system 100 displays an image using pixels. The displays 110 may utilize any number of pixels. Generally a resolution of a display 110 is referred to as the number of horizontal pixels per line and the number of lines in the vertical scan direction. The high definition (HD) display 110, for example, may display an image 1366 pixels by 768 lines, resulting in a total pixel count of 1366*768=1,049,088. However, a display 110 in the augmented reality system 100 may utilize any resolution. In one embodiment, for example, the display may include a processor 115. As discussed in further detail below, the processor 115 of the display 110 may be used to process image data received by the display 110

The augmented reality system 100 further includes at least one processor 120. The processor(s) 120 may be a central processing unit (CPU), a graphics processing unit (GPU), a physics processing unit (PPU), a field programmable gate array (FPGA) or any other logic device, or combination thereof. The processor(s) 120 generates the image data to be viewed on the display(s) 110 at a first rate, as discussed in further detail below. As those of ordinary skill in the art would recognize, the processor(s) 120 may execute instructions from a computer-readable medium (not illustrated), including, but not limited to a non-transitory computer-readable medium, to implement the augmented reality system 100 discussed herein.

Typical augmented reality display systems suffer from a variety of faults resulting in image instability, rainbow effects and the like. Accordingly, the augmented reality system 100 utilizes one or more super buffers 130 to buffer the image data generated by the processor(s) 120. The super buffer(s) 130 may be any type of volatile memory, non-volatile memory, or combination thereof. In one embodiment, for example, the processor 120 may be communicatively coupled to the super buffer(s) 130 via a DDR3/DDR4 memory bus. However, one of ordinary skill in the art would recognize that a variety of data transfer systems could be used, including, but not limited to GDDR3/GDDR5 memory bus, PCI Express or a custom address/data bus, or a combination thereof.

As discussed in further detail below, the processor 120 may transfer the image data to the display 110 from the super buffer(s) 130 at a higher rate than the image data is being generated by the processor 120. In one embodiment, for example, the image data may be transferred to the display 110 via a CoaXPress data bus. However, one of ordinary skill in the art would recognize that a variety of data transfer systems could be used, including, but not limited to DVI, HDMI, DisplayPort, Fibre Channel, a custom pixel bus, or a combination thereof.

The augmented reality system 100 further includes one or more sensors 140. Data from the sensor(s) 140 may be analyzed by the processor 120 to determine what image should be displayed on the display 110. The sensor(s) 140 in the augmented reality system may include, but are not limited to, one or more head tracking sensors, eye tracking sensors, position sensors (for example, a GPS receiver), altitude sensors, cameras, radar systems, gyroscopes, inertial reference units (IRU), or any combination thereof. The sensor(s) 140 may be mounted on or within the display 110 itself, may be located anywhere proximate to the display 110, may be communicatively connected (wired or wirelessly) to the display 110 and/or the processor, or any combination thereof.

While new aircraft or other new vehicles could be manufactured with the hardware configuration described in FIG. 1, many existing aircraft may have to be modified or supplemented with new equipment to handle the demands of the augmented reality display.

Figure 2:
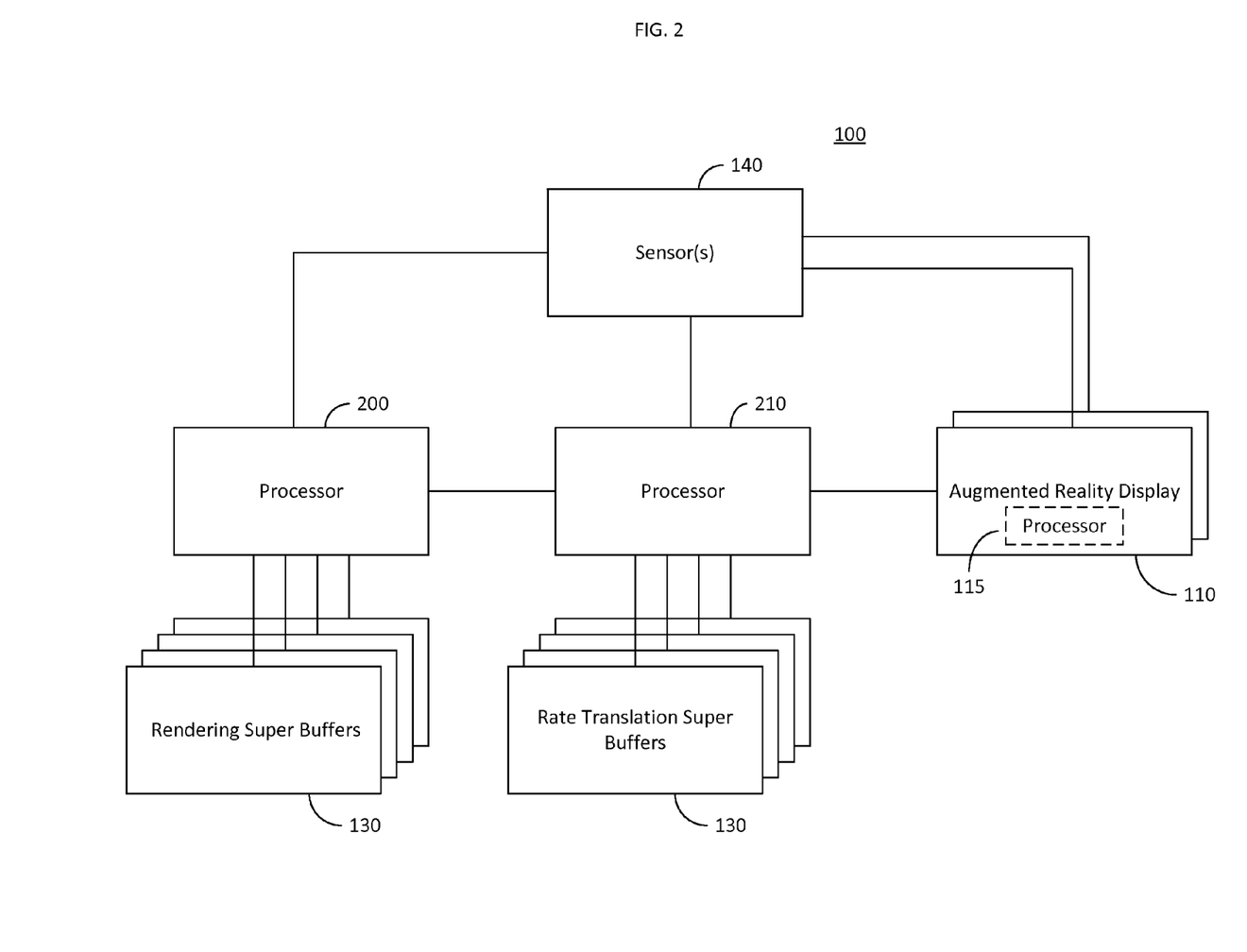
FIG. 2 is a block diagram of another exemplary augmented reality system, in accordance with an embodiment.

FIG. 2 is a block diagram of another exemplary augmented reality system 100, in accordance with an embodiment. The augmented reality system 100 includes two processors, 200 and 210. The configuration illustrated in FIG. 2 may be suited towards modifying or supplementing an existing system. The existing system may be, for example, a vehicle such as an aircraft, an automobile, a spacecraft, a watercraft or any other type of vehicle or combination thereof. However, one of ordinary skill in the art would recognize that the augmented reality system 100 could be incorporated into a variety of other systems, including, but not limited to, personal computers, mobile devices, gaming or other entertainment systems, or the like.

In one embodiment, for example, the processor 200 may be an advanced graphics module (AGM), or other processor, in an aircraft. However, in other embodiments, for example, the processor 200 may be one or more processors in a personal computer (e.g., a CPU or graphics processing unit (GPU), etc.), a mobile device (cell phone, tablet, etc.), an automobile, a personal transport, trucks, trains, ships, or the like. The processor(s) 200 may be a central processing unit (CPU), a graphics processing unit (GPU), a physics processing unit (PPU), a field programmable logic array (FPGA) or any other logic device, or combination thereof. As discussed in further detail below, the first processor 200 generates image data for the display 110.

The processor 200 may be capable of generating the image data at a lower rate, but may not be capable of updating the display 110 at a high enough rate to eliminate the undesirable imaging effects. Accordingly, the processor 200 may first generate the image data, save the image data into rendering super buffers 130 coupled to the processor 200, then transfers the generated image data saved in the rate translation super buffers 130 to a second processor 210. The processor 210 may be, for example, be a central processing unit (CPU), a graphics processing unit (GPU), a physics processing unit (PPU), a field programmable logic array (FPGA) or any other logic device, or combination thereof. As discussed in further detail below, the processor 210 saves the image data into the super buffer 130 coupled to the processor 210 and transmits portions of the image data to the display. In one embodiment, for example, the processor 200 may transfer the data to the processor 210 utilizing a standard video interface, such as digital visual interface (DVI), high-definition multimedia interface (HDMI), DisplayPort, Fibre Channel, or a combination thereof. However, one of ordinary skill in the art would recognize that any wired or wireless bus with sufficient bandwidth could be used to transfer the image data.

In one embodiment, for example, the processor 200 renders the image data and saves the rendered image data in the rendering super buffers 130. The processor 200 then outputs the image data from the rendering super buffer 130 to the processor 210. The processor 210 writes the new data into one or more of the translations super buffers 130. The processor 210, for example, may simultaneously roam a one or more other rate translation super buffers 130 which previously received data, transmitting the image data at the faster rate for transmission to the display(s) 110. Both sets of super buffers 130 may use a ping-pong architecture. In one embodiment, for example, the processor 200 may utilize time multiplexing to alternate between the left and right eye view (thus two buffers).

While FIG. 2 is depicted as having two processors 200 and 210, one of ordinary skill in the art would recognize that the augmented reality system 100 could have any number of processors. Furthermore, while FIG. 2 was discussed in the context of retrofitting an existing system having a processor 200 to include the other features of the augmented reality system, one of ordinary skill in the art would recognize that a new augmented reality system 100 could be built based on the description in FIG. 2.

Figure 3:
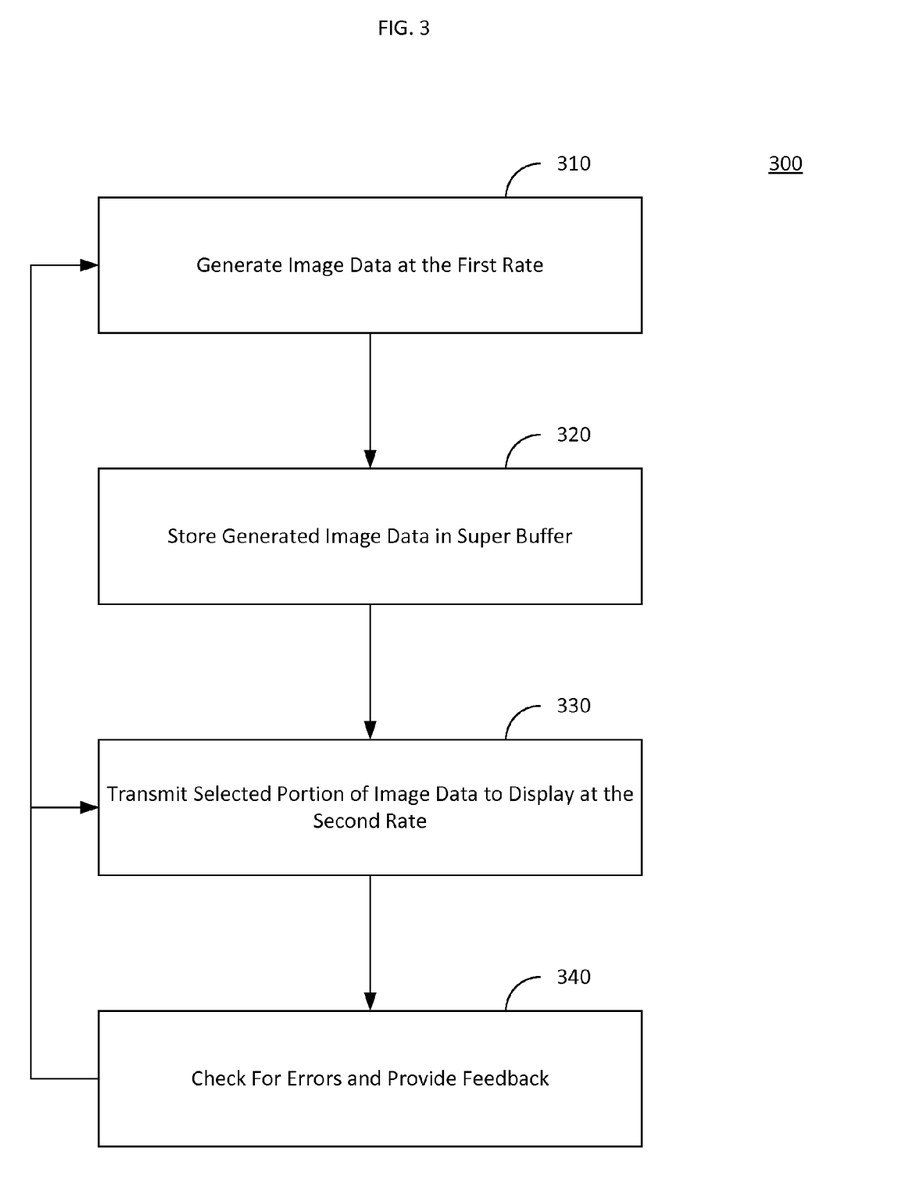
FIG. 3 is a flow chart illustrating an exemplary method for operating an augmented reality system, in accordance with an embodiment.

FIG. 3 is a flow chart illustrating an exemplary method 300 for operating an augmented reality system, in accordance with an embodiment. A processor, such as the processor 120 or 200, first generates image data having a first field of view at a first rate. (Step 310). The first field of view is greater than a field of view of a display 110. As discussed above, the display 110 is capable of displaying an image at a predetermined resolution. The predetermined resolution may vary depending upon the type of the display 110 and the desired resolution of the display 110. The image data generated by the processor 120, 200 is generated at a larger resolution. In other words, the processor 120, 200 generates an image larger than the display 110 is capable of displaying at the resolution at which the image is intended to be displayed. For example, the display 110 could be capable of displaying an image 1280 pixels by 720 lines, but the generated image may be 1920 pixels by 1200 lines. However, one of ordinary skill in the art would recognize that the size of the generated image and the size of the image capable of being displayed on the display may vary.

The resolution of the generated image may be based upon a maximum expected rotational speed of a user's head while using the augmented reality display system 100, the rate at which the image is generated, the resolution of a display 110 and a refresh rate of the display 110. In other words, the processor 120, 200 generates an image having a field of view large enough to update the image on the display 110 multiple times before a new image is generated by the processor 120, 200. In one embodiment, for example, the resolution of the generated image may be based upon a maximum expected head rotation rate in a horizontal direction of two hundred and forty degrees per second and a maximum expected head rotation rate in a vertical direction of one hundred and ten degrees per second. However, one of ordinary skill in the art would recognize that maximum expected head rotation rate may vary depending upon how the augmented reality system 100 is being used.

The content of the image data may vary widely and will depend upon the application of the augmented reality system 100. If the augmented reality system 100 is implemented in an aircraft, for example, the image data may include terrain data, head-up display (HUD) symbology such as pitch and roll tape, heading indicator, altitude, airspeed, flight path vector, weather radar, radar, video, traffic information, or any combination thereof. In one embodiment, for example, the rendered terrain may be rendered to appear in three-dimensions such that the rendered terrain is conformal with the view of the pilot through the windshield of the aircraft. Furthermore, the rendered terrain may be rendered as a wire frame, fully enclosed three dimensional terrain, or a combination thereof. The terrain may be rendered in color, black and white, grayscale, or any combination thereof. In other embodiments, for example, the image data may include gaming scenarios, virtual reality training, maintenance aids, situation awareness displays, or any combination thereof.

In one embodiment, for example, the processor 120, 200 may generate two or more sets of image data for each display 110. When the augmented reality system 100 is implemented, for example, in an aircraft, a first data set may include menus, control buttons and sighting commands. The second set of image data may include, for example, head-up display (HUD) symbology and rendered terrain. The processor 120, 200 may render the image data in two sets as it may be desirable to have one set of image data (such as menus) move with a user's head, while having another set of image data, such as the HUD/terrain symbology, stay in substantially the same position on the display 110.

When the processor 120, 200 generates multiple sets of image data for each display, the processor 120, 200 may use alpha compositing or any other method to control the blending of the multiple sets of image data. The processor 120, 200, for example, can assign part of, or one of the entire data sets, as having priority such that the part or entire image set is always displayed in front of any other data, assign parts of each data set as having priority, or control a blend (i.e., control the transparency) of the multiple data sets such that image data from multiple sets of image data is visible of the display 110.

As noted above, the image data generated by the processor 120, 200 is generated at a first rate. The first rate is slower than a refresh rate of the display 110. In one embodiment, for example, the first rate may be sixty hertz. However, one of ordinary skill in the art would recognize that the first rate may vary depending upon the needs of the system, the processing capability of the processor 120, 200 and the desired size of the image data.

The content of the image data generated by the processor 120, 200 may be based upon data from the sensor(s) 140. As discussed above, the sensor(s) may include a head tracking system, an eye tracking system and/or a display location/orientation tracking system producing, for example, X, Y and Z positions and pitch, roll and yaw angles of the head. The processor 120, 200 may determine, based on data from the sensor(s) 140, where the user is looking (or where the device is pointed) and base the generated image thereon. In one embodiment, for example, the processor 120, 200 may generate the image data centered around a current location that the user is looking or where the device is pointed. In other words, the center of the generated image may be at a center of the user's current field of view through the display 110. However, the processor 120, 200 could also generate the image based upon a rotational head rate of the user or the display 110 itself. If a sensor 140 is reporting that a user's head or the device itself is moving, for example, to the left, the processor may center the generated image left of the center of the user's/display's current field of view such that there is more data available in the generated image in the direction in which the user's head or the display is moving.

In one embodiment, for example, the image data generated by the processor 120, 200 may include a signature pattern. In one embodiment, for example, the signature pattern may be located in a fixed location in the generated image, such as the bottom left corner. However, one of ordinary skill would recognize that the signature pattern could be located in any one, or multiple locations throughout the generated image data. The signature pattern may be used, for example, for error checking. In other words, a known pattern may be placed in the signature pattern. The processor 115 of the display and/or the processor 210 analyze the pattern in the image data to verify that the image data is uncorrupted. In one embodiment, for example, the signature pattern may contain cyclic redundancy check (CRC) data. However, one of ordinary skill in the art would recognize that a variety of different data integrity methods could be used.

In one embodiment, for example, the image data generated by the processor 120, 200 may also include control pixels. The control pixels include location data corresponding to the generated image data. As discussed above, the augmented reality system 100 displays data on the display 110 which supplements a live image or is overlaid onto a transparent display in such a way that the generated image provides supplemental data over a view seen by a user. Accordingly, the processor 120, 200 may embed data within the image which corresponds to a location where the image data is focused around such that the generated image data can be overlaid in a correct position. The control pixels may define, for example, a location corresponding to a center of the generated image, the bounds of the generated image, head or eye position and orientation of the currently rendered image, or a combination thereof.

As discussed in above, data may be transferred in the augmented reality system using a standard interface, including, but not limited to, digital visual interface (DVI), high-definition multimedia interface (HDMI), DisplayPort, Fibre Channel, or any combination thereof. The DVI and HDMI standards, for example, utilize 24-bit channels. In other words, in a typical data transfer using a DVI or HDMI interface each pixel of the display is assigned 24-bits of image data, broken upon into 8-bits of red data, 8-bits of green data and 8-bits of blue data. As the DVI and HDMI standards are limited to 24-bit channels, the standard display format leaves no room for transmitting alpha compositing or any other weighting system with the image data. Accordingly, in the embodiments where the augmented reality system 100 is limited to 24-bit data channels, the processor 120, 200 may generate the image data utilizing 8-bits of green data, 6-bits of red data, 6-bits of blue data and 4-bits of weighting data. In this embodiment, for example, the processor 120 may place the weighting data in place of the two least significant bits of the red and blue data, sacrificing a small amount of color depth for blending control over the image data. As one skilled in the arts will recognize, there are numerous encoding options to embed the alpha into the nominal RGB scheme. For example, one could use 6-bits for each color and 6-bits for alpha (4×6 rather than 3×8). The processor 115 of the display, for example, may be configured to interpret the data, which would otherwise be part of the image data, as the weighting data when displaying the selected portion of the generated image.

The processor 120, 200 then updates the super buffer(s) 130 with the generated image data at the first rate as the data is generated. (Step 320). In the embodiment illustrated in FIG. 1, for example, the processor 120 is directly communicatively connected to the super buffer(s) via a high speed bus. In the embodiment illustrated in FIG. 2, for example, the processor 200 transmits the generated image data to the processor 210, which then stores the generated image data into the super buffer(s) 130.

In one embodiment, for example, the processor 120, 210 may not merely overwrite the exiting data in the super buffer 130, but may store the newly generated image in a different location. As the image data is updated on the display 110 at a faster rate than the image is being generated, rewriting over the existing data could increase the latency at the display 110 while the old image data is being overwritten. Accordingly, in one embodiment for example, the processor 120, 210 may alternate locations where the image data is saved so that image data is always available to upload to the display 110 in a classical ping/pong architecture.

The processor 120, 210 then transmits a selected portion of the generated image data to the display 110 at a second rate. (Step 330). In one embodiment, for example, the second rate may be four hundred and eighty hertz. At a refresh rate of four hundred and eighty hertz the image presented on the display 110 should be free of any of the latency based effects typical augmented reality displays are subject to. However, one of ordinary skill in the art would recognize that the second rate may vary depending upon the needs of the augmented reality system 100.

Accordingly, the augmented reality system 100 can advantageously update a display 110 at a very high rate without having to generate the image data as the higher rate. In other words, because the image generated by the processor 120, 200 and stored in the super buffer 130 is larger than the display 110 is capable of displaying, the processor 120, 210 can update the image on the display 110 using the existing data in the super buffer 130 rather than having to generate image data at the higher refresh rate. This allows the augmented reality system 100 to perform better (i.e., have far fewer latency based imaging effects) than existing augmented reality systems without having to use significantly more expensive hardware.

The portion of the generated image data selected to be transmitted to the display 110 is based upon data from the one or more sensors 140. The sensor(s) 140, for example, can track position and orientation data such as a user's head position, a user's eye position, and/or a position of the display 110 itself. The position data is transmitted to the respective processor 120, 210 in the augmented reality system 100. The processor 120, 210 then determines which portion of the generated image to transmit to the display 110 based upon the position data and the control pixels embedded in the generated image. As discussed above, the processor 120, 200 may embed location data corresponding to the generated image in the form of control pixels. The processor 120, 210 utilizes the position data and the control pixels embedded in the generated image to select which portion of the generated image to transmit to the display 110. If a user is moving quickly enough such that the portion of the image where the control pixels or signature pattern are embedded would be displayed, the processor 120, 210 or the processor 115 in the display may remove those portions from the generated image before displaying the generated image to the user. In another embodiment, for example, the processor 120, 200 may add weighting data to the control pixels and/or signature patterns such that the respective areas of the generated image are one hundred percent transparent.

The processors 120, 200, 210 and/or 115 then check for errors and provide and/or receive feedback. (Step 340). As discussed above, the processor 120, 200 may embed a signature pattern within the image data. The signature pattern may be any predetermined image designed to exercise the various rendering primitives of the underlying graphics system such as triangles, lines, points, textures, or the like.

In one embodiment, for example, the processor 115 of the display may determine if a signature pattern embedded within the received image data matches the predetermined image. If the image in the signature pattern matches the predetermined image, the processor 115 displays the respective portion of the image data on the display 110. When the image in the signature pattern does not match the predetermined image, possibly due to data corruption, the processor 115 signals an error. In another embodiment, for example, an intermediary processor, such as the processor 210 may determine the signature pattern embedded in the image generated by the processor 200 matches the predetermined image. However, the augmented reality system 100 may perform error checking any time data is transferred. In operational critical applications, the results of a persistent signature pattern error would be to shutdown the display system to avoid presenting misleading information. In normal situations, the signature pattern is either ignored or results in a warning message when a persistent failure occurs.

The processors 120, 200 and or 210 receive feedback from another processor and/or data from one of the sensor(s) 140. The feedback may include, but is not limited to, error codes and updated position data. As noted above, the feedback is provided to the processor 120, 200 at at least the first rate such that the processor 120, 210 can generate new image data in Step 310. The feedback is also provided to the processor 120, 210 at the second rate such that the portion of the image data can be selected and transmitted to the display 110 at the second rate in Step 330.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An augmented reality system, comprising:
a display;
a memory; and
a first processor communicatively coupled to the display and memory, the first processor configured to generate image data having a first field of view and having a first resolution at a first rate, wherein the generated image data includes control pixels, the control pixels including location data corresponding to the image data;
a second processor communicatively coupled to the first processor, the display and the memory, the second processor configured to:
store the generated image data in the memory; and
transfer a portion of the generated image data having a second field of view smaller than the first field of view and having a second resolution to the display from the memory at a second rate, wherein the second rate is faster than the first rate and the second resolution is smaller than the first resolution,
wherein the first processor and the second processor are communicatively connected via a twenty-four bit data channel, and the first processor is configured to generate the image data where each pixel of the image data includes 8-bits of green data, 6-bits of red data, 6-bits of blue data and 4-bits of weighting data, the weighting data defining a transparency of each pixel.

2. The augmented reality system of claim 1, further comprising:
a sensor communicatively coupled to the first processor, the sensor configured to output head position and orientation data,
wherein the second processor is further configured to select the portion of the generated image data to transfer to the display based upon the head position data.

3. The augmented reality system of claim 2, wherein the first processor is further configured to generate the image data based upon the head position and orientation data.

4. The augmented reality system of claim 1, further comprising:
a sensor communicatively coupled to the first processor, the sensor configured to output head rotational rate data, wherein one of the at least one processors is further configured to generate the image data based upon the head rotational rate data.

5. The augmented reality system of claim 1, wherein generated image data includes a signature pattern.

6. The augmented reality system of claim 5, wherein the second processor is configured to verify an integrity of the transferred portion of the generated image data based upon the signature pattern.

7. The augmented reality system of claim 1, wherein first processor is configured to generate at least two images and the second processor is configured to transmit a portion of each of the at least two images to the display such that each of the two images are displayed simultaneously based upon the weighting data.

8. A method of controlling an augmented reality system, comprising:
generating, by a first processor, image data having a first field of view and having a first resolution at a first rate, the generated image data includes control pixels, the control pixels including location data corresponding to the image data;
storing, by a second processor, the generated image data in a memory;
transferring, by the second processor, a portion of the generated image data having a second field of view smaller than the first field of view and having a second resolution to a display of the augmented reality system from the memory at a second rate, wherein the second rate is faster than the first rate and the second resolution is smaller than the first resolution,
wherein the first processor and the second processor are communicatively connected via a twenty-four bit data channel, and the first processor is configured to generate the image data where each pixel of the image data includes 8-bits of green data, 6-bits of red data, 6-bits of blue data and 4-bits of weighting data, the weighting data defining a transparency of each pixel.

9. The method of claim 8, wherein the generating further comprises embedding signature pattern into the image data, and the method further comprises determining, by second processor, data integrity of the image data based upon the signature pattern.

10. The method of claim 8, further comprising:
determining, by the first processor, content of the image data based upon head position data output by a sensor.

11. The method of claim 8, further comprising:
  determining, by the first processor, content of the image data based upon head rotational rate data output by a sensor.

12. A non-transitory computer readable medium storing instructions, which when executed by a first processor, cause the first processor to:
  generate image data having a first field of view and having a first resolution at a first rate, the generated image data includes control pixels, the control pixels including location data corresponding to the image data;
  the non-transitory computer readable medium storing instructions, which when executed by a second processor, cause the second processor to:
  store the generated image data in a memory;
  transfer a portion of the generated image data having a second field of view smaller than the first field of view and having a second resolution to a display from the memory at a second rate, wherein the second rate is faster than the first rate and the second resolution is smaller than the first resolution,
  wherein the first processor and the second processor are communicatively connected via a twenty-four bit data channel, and the first processor is configured to generate the image data where each pixel of the image data includes 8-bits of green data, 6-bits of red data, 6-bits of blue data and 4-bits of weighting data, the weighting data defining a transparency of each pixel.

13. The non-transitory computer readable medium of claim 12, wherein the first rate is forty hertz and the second rate is four hundred and eighty hertz.

14. The non-transitory computer readable medium of claim 12 which when executed by the first processor, further cause the first processor to:
  determine content of the image data based upon head position data output by a sensor.

15. The non-transitory computer readable medium of claim 12 which when executed by the first processor, further cause the first processor to:
  determine content of the image data based upon head rotational rate data output by a sensor.

* * * * *